Figure 1:
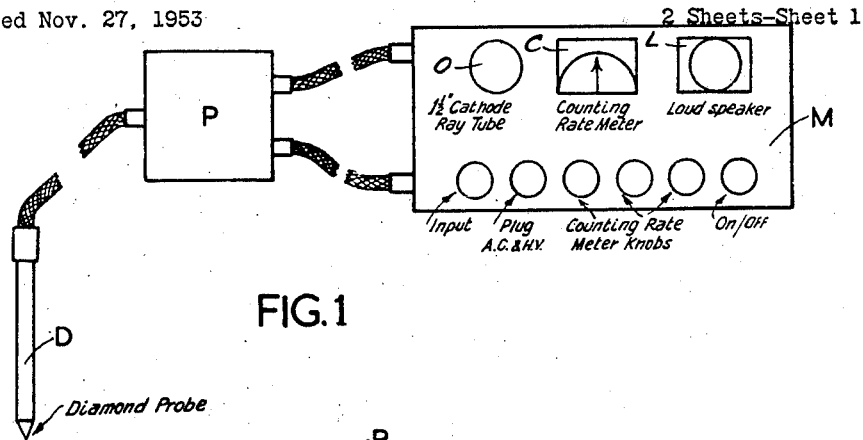

Sept. 10, 1957 W. F. COTTY 2,806,145
ELECTRICAL DETECTING APPARATUS
Filed Nov. 27, 1953 2 Sheets-Sheet 1

INVENTOR:
WILLIAM FELTHAM COTTY

United States Patent Office 2,806,145
Patented Sept. 10, 1957

2,806,145

ELECTRICAL DETECTING APPARATUS

William Feltham Cotty, Cliveden Mead, Maidenhead, England

Application November 27, 1953, Serial No. 394,788

Claims priority, application Great Britain November 26, 1952

16 Claims. (Cl. 250—83.3)

The invention relates to electrical apparatus, in particular to a radiation detector utilising a diamond for detecting different types of radiation as, for instance, alpha, beta and gamma rays, X-rays, cathode rays, ultra-violet rays and infra-red rays.

Under the influence of atomic and light rays small pulses of electricity are generated in a diamond working in an electric field. These pulses may be amplified and may operate indicating devices such as oscilloscopes, counting rate meters, or other instruments of this kind. Known apparatus, however, are bulky and not very well suitable for use in medical examinations, for geological surveys or other industrial purposes where small probes are required. When used in a live body of a human being or animal, special attention must be paid to the protection of the body and also of the operator against accidental electric shocks.

It is an object of the invention to provide a pinpoint detector for the purposes specified. It is another object of the invention to provide a pinpoint detector to be handled completely independently of the amplifier arrangement.

It is a further object of the invention to provide an apparatus of the kind specified in which the electric field in the probe need not exceed an upper limit marking a danger point for use in a live body.

According to the invention, the diameter of the probe is made small by using a drilled diamond as counting probe so as to be able to dispense with the bulky clamping arrangement at the head of the probe as used up to now. The diamond is provided with a hole just large enough to take an electrode wire which is the centre wire of a flexible coaxial cable, the outer flexible metal screen or sheath of which constitutes the second electrode. The space between the wire and the metal sheath may be filled with an insulating material, for instance a plastic, flexible material such as polyethylene. The second electrode is preferably encased in a rubber sleeve. The free ends of the electrodes, i. e., of the centre wire and of the metal sheath are fixed in a push-on plug so that the probe constitutes an independently operable small unit adapted to be plugged, after insertion into the area being investigated, either into a second flexible lead or into the corresponding socket of a box containing a preamplifier equipment, which in turn may be fixed directly or through a further flexible cable with push-on plug and socket to the main part of the instrument remote from the probe.

It is not necessary to drill a hole right through the diamond, according to another aspect of the invention, but only so far that the end of the wire remains at such a distance from the outermost point as to ensure a symmetrical electric field between the electrodes. A satisfying effect was obtained when drilling about three quarters of the way through the middle of the diamond. In this manner, not only expensive drilling time is saved but the undrilled part of the diamond presents also a natural insulating cap so that an insulating disk at the tip of the diamond in the flexible tube can be dispensed with.

This leads to a further development of the invention for special medical applications. In some cases, it might be advantageous to puncture the skin with the probe. It is within the scope of the invention to adapt the diamond itself for puncturing the skin. For this purpose, the diamond should be cut to a sharp point at its exposed end which must not be concealed under a rubber cap and/or the ends of a metal screen. The point may be triangular or pyramid-shaped. A thin layer of non-corrosive metal having good electric conductivity is evaporated on or otherwise applied to the exposed point in contact with the metal sheath around the probe forming an electrostatic screen. Suitable metals are, for instance, gold, silver, and aluminum.

The arrangement of a drilled diamond with one electrode inside it and the second electrode outside has the advantage of making it possible to obtain a symmetrical electric field and work with a much smaller electric charge than in the case of an electric field produced between two electrodes clamping or enclosing the diamond between them as in previous arrangements. Instead of one drilled diamond, a series of drilled diamonds may be set on the centre wire in a row one behind the other. The preamplifier arrangement is surrounded by a screened case.

A blocking condenser is inserted in the line leading to the centre wire for charging the diamond while the line coming from the outer screen or sheath of the probe is connected to ground. No high tension current can pass to the diamond probe so that there is no danger of electric shock either to a live body during a medical examination or to the operator. In the preamplifier circuit, the diamond pulses are applied directly between grid and cathode of a vacuum tube, thus doing away with the usual grid leak.

As during continued exposure of the diamond or crystal polarization or space charge effects may appear which may impair the counting properties of the crystal, a regenerative circuit may be provided for feeding back pulses tapped from a discriminator through a rectifying tube and a capacitance and thus building up an additional field to compensate for the polarization effects.

The preamplified signals are conveyed through another flexible cable to the main instrument which is adapted to constitute, when used with the pinpoint detector or counting diamond of the present invention, a portable apparatus. This is accomplished by simplifying the arrangement of the main instrument so as to be able to mount the required number of parts thereof within a limited space. While known instruments are built up of adjustable units, the new instrument is limited to the use of diamonds or similar non-conductors as counting crystals with certain voltages and amplification stages sufficient to obtain a clear indication of the pulses either in a counting rate meter and/or oscilloscope of small dimensions and/or in a loud-speaker. The use of a loud-speaker is of special value when the probe is used for medical investigations during which, of necessity, the main amplifier must be located remote from the probe and its operator is not able to watch the indicating instruments.

Figures 2, 2A:
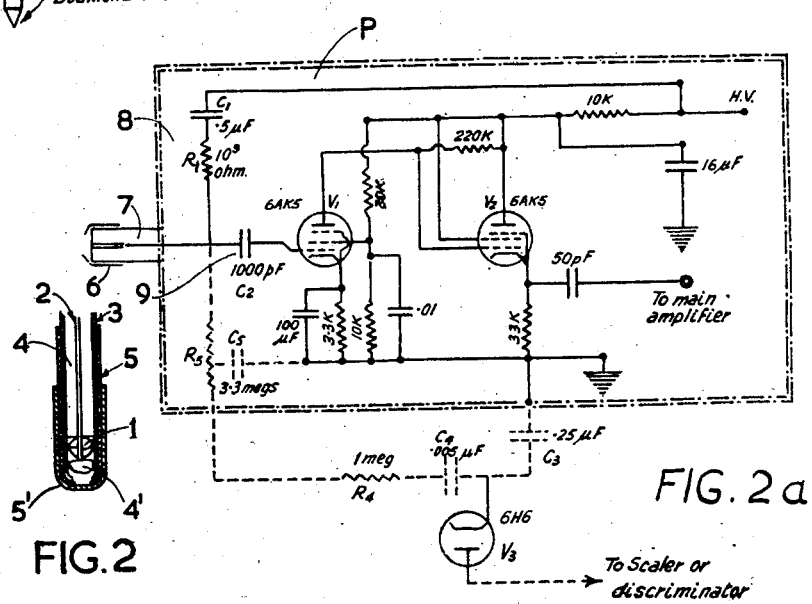
Figures 4, 5:
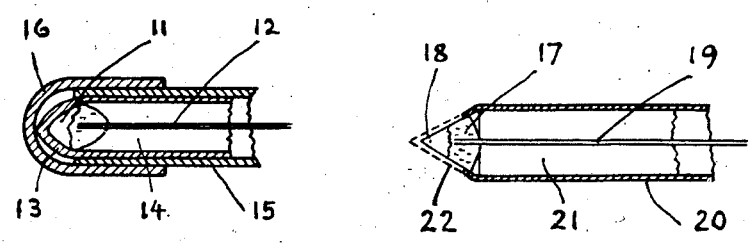
Figure 3:
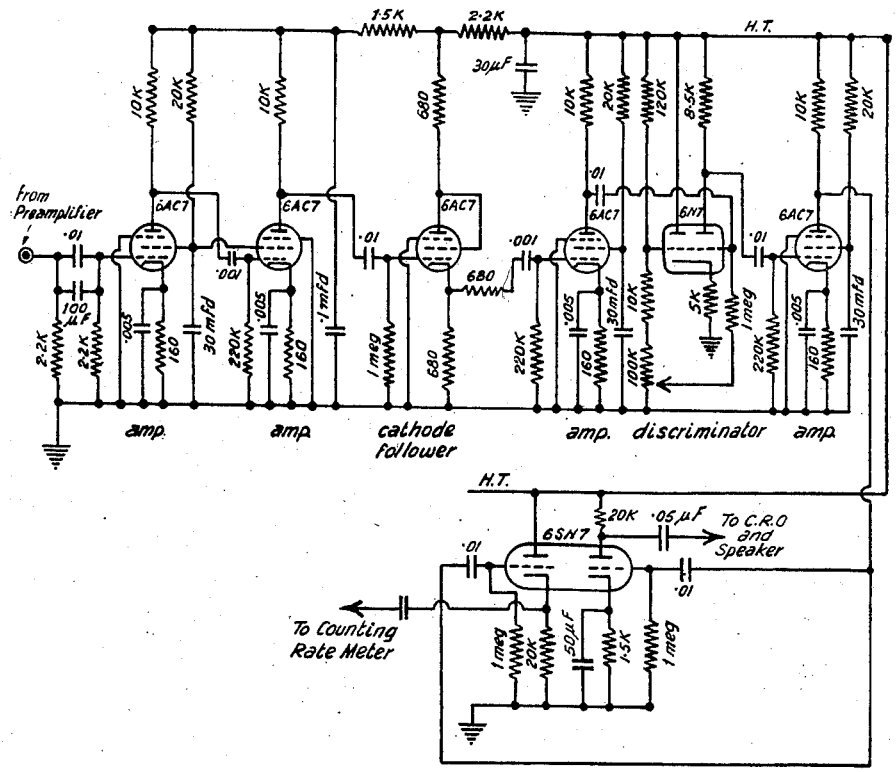

Embodiments of the invention, including several forms of the probe itself, are shown in the accompanying drawings in which:

Fig. 1 is a diagrammatic view of the general arrangement of the main parts of a portable instrument embodying the invention, Fig. 2 is an enlarged, partly detailed, diagrammatic view of the probe, Fig. 2a is a circuit diagram of a pre-amplifier unit, Fig. 3 is a circuit diagram of the main amplifier of a portable instrument according to the invention, Fig. 4 is a magnified section through the front end of a probe with a diamond not completely drilled through, and Fig. 5 is a magnified cross section through the front end of a pointed probe for puncturing the skin.

Referring now more particularly to the general arrangement Fig. 1, the diamond probe D is joined to the preamplifier P by a preferably flexible coaxial cable and push-on plug. The preamplifier unit P is in turn connected to the main amplifier M, also by coaxial cables and push-on plugs. Commercially avialable parts are not shown in detail throughout the drawings.

The main amplifier M is part of a unit which is provided with three indicators, to wit, a cathode ray tube (oscilloscope) O, a counting rate meter C, and a loudspeaker L. The front of the unit presents, besides the two sockets for its connection with the preamplifier, a pair of sockets for the alternating current, high voltage supply to, and for the input from, the preamplifier, as well as three knobs for the counting rate meter and a switch for the electric current.

In Fig. 2, diamond 1 is holed or centrally bored and central wire 2 is inserted with a snug fit into the hole to form one electrode, the other electrode being constituted by the metal screen or sheath 3 around the flexible polyethylene tube 4 insulating the wire. The probe is encased in a rubber tube 5. The wire inserted in the diamond is prevented from contacting the metal sheath at its outer end by an insulating disk 4' on top of the diamond, over which the ends of the metal sheath are bent together under rubber cap 5'. The charge transmitting central wire 2 and metal screen 3 are connected to the terminals of a push-on plug 6 fitting into a corresponding socket 7 on the screened preamplifier box or housing 8. The central wire 2 is connected to the first vacuum tube through a blocking condenser 9, and by this means no grid leak is required. The preamplifier of Fig. 2a comprises a two tube circuit. The first valve $V_1$ amplifies the incoming pulses and is directly coupled to the grid of the second valve $V_2$. Here again no grid leak is used. $V_2$ acts as a cathode follower and reduces the impedance of the circuit so that the main amplifier can be connected to the preamplifier by a coaxial cable and set up some distance away. Separate leads carry the alternating current and the high voltage to the preamplifier. All plugs used to make connections for the coaxial cables are preferably of a type not requiring turning (screwing) movement of the plugs for insertion into or withdrawal from a socket.

The diamond is energized from the preamplifier's high voltage supply through condenser $C_1$ and resistance $R_1$. By using condenser $C_1$ direct current is prevented from passing to the diamond probe so that the diamond 1 is subjected to and operates in an electric field.

The electric field may also be obtained through the regenerative circuit shown in dashed lines in Fig. 2a. The pulses are tapped from the discriminator through a rectifying valve $V_3$ and stored in condenser $C_3$. The field is built up through the associated network including condensers $C_4$ and $C_5$ and resistances $R_4$ and $R_5$.

The main amplifier, see Fig. 3, provides two stages of amplification, one of which is a fast stage. The current passes through a cathode follower into another amplifying stage and then to a discriminator, from which the counting rate meter or the cathode ray (oscilloscope) indicator and the loudspeaker are fed. The pulses passed by the discriminator are amplified before being fed into a double triode 6SN7, one section of which acts as a power amplifier and the other as a cathode follower operating the three indicating devices. Dimensions and commercial markings inserted in the drawings for vacuum tubes, resistances and condensers have proved suitable, but it is not meant to limit the scope of the invention to such dimensions.

By the simplified arrangement as described above, it is possible to assemble the main amplifier parts, including discriminator and indicating devices, in a portable unit in spite of the addition of a loudspeaker or earphone. The latter two, as noted above, are advantageous when operating with a probe and a preamplifier remote from the indicating device, in which case the operator is not able to watch the output indicating instruments. By converting the pulses into suitable signals, this drawback can be overcome.

Instead of the probe represented in Fig. 2, the probe according to Fig. 4 may be employed. The latter comprises a partly drilled diamond 11 containing the end of central wire 12. The ends of metal screen 13 are bent together over the undrilled part of the diamond. The insulation 14 is a flexible polyethylene tube. The probe is encased in a rubber tube 15 and closed by a rubber cap 16.

A somewhat modified probe for special medical purposes is shown in Fig. 5 and has a diamond 17 with a sharp point 18. The diamond is partly drilled through to receive the end of central wire 19. The surrounding metal sheath 20 is insulated from the wire 19 by a polyethylene tube 21. In contact with metal sheath 20 is a thin layer of a non-corrosive metal 22 such as gold, silver, or aluminum applied to the pointed end 18 of the diamond 17. The metal layer may be evaporated onto the diamond point or applied in any other suitable way.

The advantages of the new detector may be summarised as follows:

The instrument is portable and its units are separable. They are connected by flexible connections with push-on plugs so as to enable the main amplifier to be located remote from the point where the detector is to be used. A pinpoint detector is also made possible by using a drilled diamond or rows of drilled diamonds in parallel (not shown) on the central wire of a flexible coaxial cable, thus doing away with bulky clamping devices in the head of the probe. In addition, the drilled diamond permits a more symmetrical field to be obtained, simplifies the mounting of the diamond, and makes the probe more flexible. By virtue of the push-on connection of the probe to the preamplifier, the probe may be first inserted in otherwise not readily accessible places, for instance in cavities of the human body, and only after insertion connected to the preamplifier. The blocking condenser in the charging line leading to the central wire prevents high voltages from passing to the diamond and acts as a safety device. In addition, the field between the wire as one electrode and the grounded metal screen or sheath of the coaxial cable as the other electrode need not be as high as in previous arrangements with a diamond clamped between the electrodes. In the diamond-grid-of-preamplifier circuit, the diamond pulses are applied directly between the grid and the cathode of the tube, thus avoiding the usual grid leak.

Polarization or space charge effects may be overcome by the alternative regenerative circuit for feeding voltage back to the probe. This ensures correct working of the instrument for long periods of time.

The main amplifier is simplified by doing away with adjustments not absolutely required so as to enable reduced dimensions for a portable instrument to be attained in spite of the arrangement of a cathode ray tube, a counting rate meter, and a loudspeaker as indicating devices for visible and audible signals.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. Radiation detecting apparatus, comprising a probe including a diamond provided with an internal bore, a wire having one end inserted into said bore and serving as a first electrode, metallic means surrounding said diamond and serving as a second electrode, means connected to both said electrodes to apply a voltage thereacross to thereby establish an electric field passing through said diamond, whereby said diamond is activated to be sensitive to incident radiation and to generate electrical pulses in response to incidence of said radiation, amplifying means connected to said electrodes, and indicating means connected to said amplifying means to receive amplified pulses therefrom and to signal characteristics of said radiation in accordance with said pulses.

2. Detecting apparatus according to claim 1, said bore in said diamond extending entirely through the latter, and insulating means on said diamond at said bore to prevent direct contact between said metallic means and said one end of said wire.

3. Detecting apparatus according to claim 1, said bore in said diamond extending only partially therethrough and leaving a portion thereof unperforated, whereby said unperforated portion of said diamond insulates said wire from said metallic means.

4. Detecting apparatus according to claim 3, said unperforated portion being shaped as a sharp point adapted to penetrate a substance being investigated, said metallic means including a thin layer of non-corrosive metal surrounding said pointed portion.

5. Detecting apparatus according to claim 1, said bore being located centrally of said diamond, whereby a uniform electric field is established between said wire and said metallic means.

6. Radiation detecting apparatus, comprising a probe including a diamond provided with an internal bore, a wire having one end inserted into said bore and constituting a first electrode, a metallic sheath substantially surrounding said probe and said diamond and constituting a second electrode, insulating material located around said wire and internally of said sheath to prevent electric contact between said electrodes, means connected to said electrodes to apply a voltage thereacross to thereby establish an electric field passing through said diamond, whereby the latter is activated to be sensitive to incident radiation and to generate electrical pulses in response to incidence of said radiation, amplifying means connected to said electrodes, and indicating means connected to said amplifying means to receive amplified pulses therefrom and to signal characteristics of said radiation in accordance with said pulses.

7. Detecting apparatus according to claim 6, said bore extending entirely through said diamond, insulating means located on said diamond at one end of said bore to close said end, and said sheath having an end portion bent up over said insulating means, whereby the latter prevents contact between said one end of said wire and said bent up portion of said sheath.

8. Detecting apparatus according to claim 7, said sheath comprising a flexible metal screen, and said insulating material comprising a tube of polyethylene.

9. Detecting apparatus according to claim 6, said bore extending only partly through said diamond and leaving a portion thereof unperforated, said sheath having an end portion bent up over said unperforated portion of said diamond to form a metallic cap therefor, whereby said unperforated portion insulates said one end of said wire from said bent up portion of said sheath.

10. Detecting apparatus according to claim 6, further including a rubber sleeve fitted over said metallic sheath.

11. Radiation detecting apparatus, comprising a probe including a diamond provided with an internal bore, a coaxial cable having an inner wire constituting a first electrode and an outer metallic sheath insulated from said wire and constituting a second electrode, said wire being inserted into said bore and said sheath being fitted over and substantially surrounding said diamond, said sheath being grounded, means including a blocking condenser connected to said wire to apply a potential across said wire and said sheath, whereby an electric field is established in said diamond between said wire and said sheath, and said diamond is activated to be sensitive to incident radiation and to generate electrical pulses in response to incidence of said radiation, amplifying means connected to said electrodes, and indicating means connected to said amplifying means to receive amplified pulses therefrom and to signal characteristics of said radiation in accordance with said pulses.

12. Detecting apparatus according to claim 11, said amplifying means including a screened preamplifier connected to said cable and a main amplifier connected to said preamplifier, and said indicating means comprising a loudspeaker connected to said main amplifier, whereby pulses produced in response to radiation incident on said probe are transformed to audible signals and visual distraction of the operator of said probe is avoided.

13. Detecting apparatus according to claim 12, said preamplifier comprising an electric circuit including at least one vacuum tube having a grid and a cathode, a second blocking condenser connected between said grid and said wire, and said sheath being connected directly to said cathode, whereby the need for a grid leak is avoided.

14. Detecting apparatus according to claim 13, said circuit including cathode follower means connected to the output side of said one vacuum tube and constituting the output side of said preamplifier, whereby the impedance of said circuit is reduced and said main amplifier, when connected to said preamplifier, may be located remotely from the latter.

15. Detecting apparatus according to claim 12, said preamplifier including a regenerative circuit, said regenerative circuit comprising capacitance means and rectifying means operatively connected to said electrodes, said main amplifier including a discriminator circuit, and means operatively connecting said discriminator circuit to said rectifying means to feed back pulses tapped from said discriminator circuit to said regenerative circuit and therethrough to said electrodes, to thereby build up an additional electric field in said diamond to counteract polarization effects in the latter.

16. Detecting apparatus according to claim 15, said main amplifier further including an amplifying circuit connected to the output side of said discriminator circuit to receive and amplify pulses emanating therefrom, and circuit means including a double triode connected to the output side of said amplifying circuit, one section of said double triode constituting a power amplifier and the other section of said double triode constituting a cathode follower, said indicating means being connected to said cathode follower.

References Cited in the file of this patent

UNITED STATES PATENTS 2,537,388   Wooldridge _____ Jan. 9, 1951

OTHER REFERENCES

Crystal Counters by Robert Hofstadter from Nucleonics, April 1949, pages 2–27.